C. A. WIBERG.
SHOCK ABSORBER.
APPLICATION FILED NOV. 27, 1920.
1,416,537.
Patented May 16, 1922.
2 SHEETS—SHEET 1.
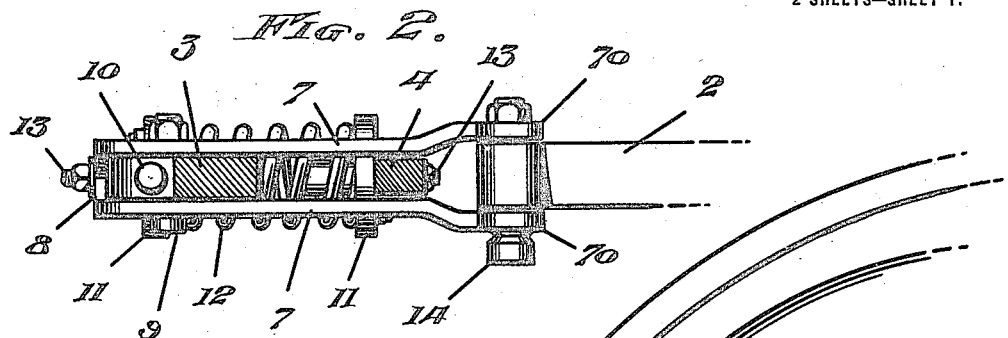
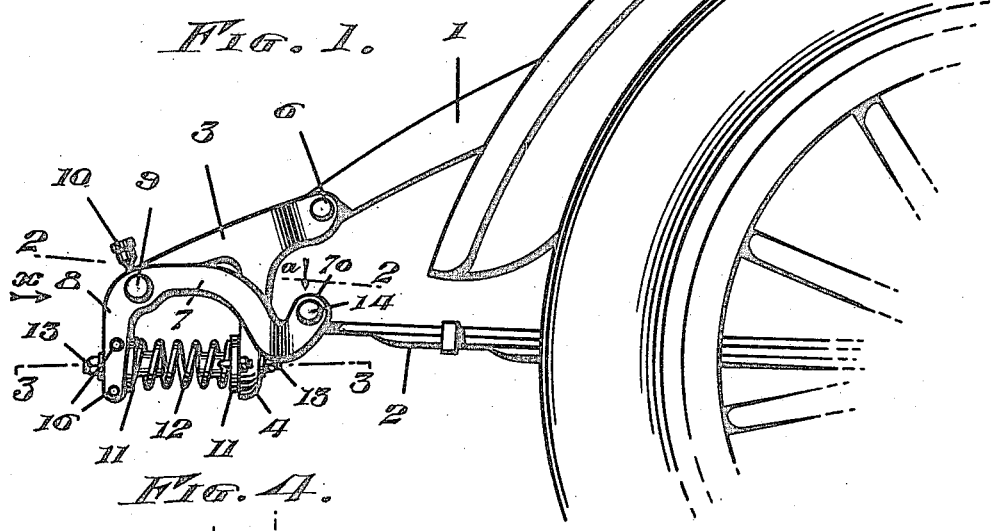
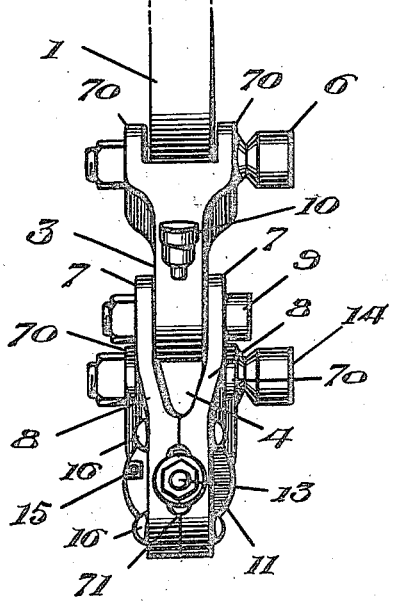
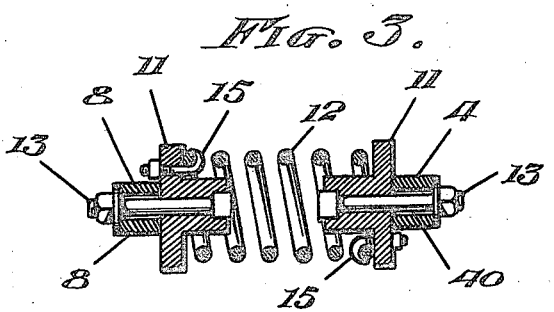
Inventor
CHARLES A. WIBERG
By Fred G. Dieterich
Attorney

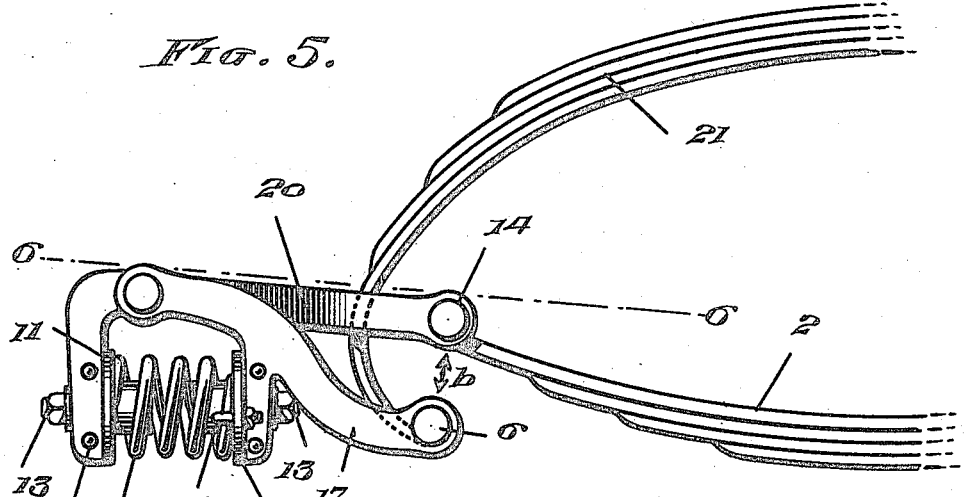
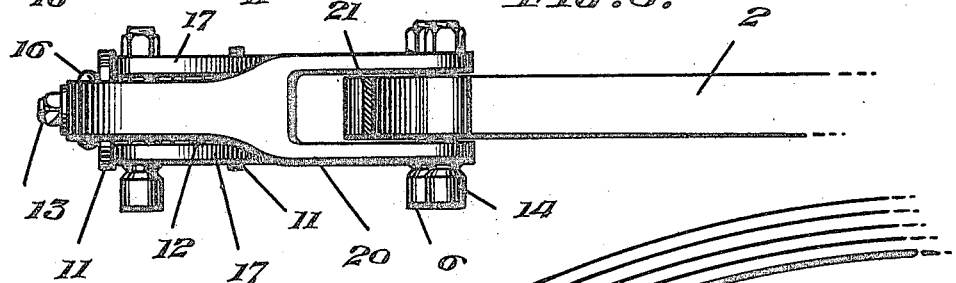
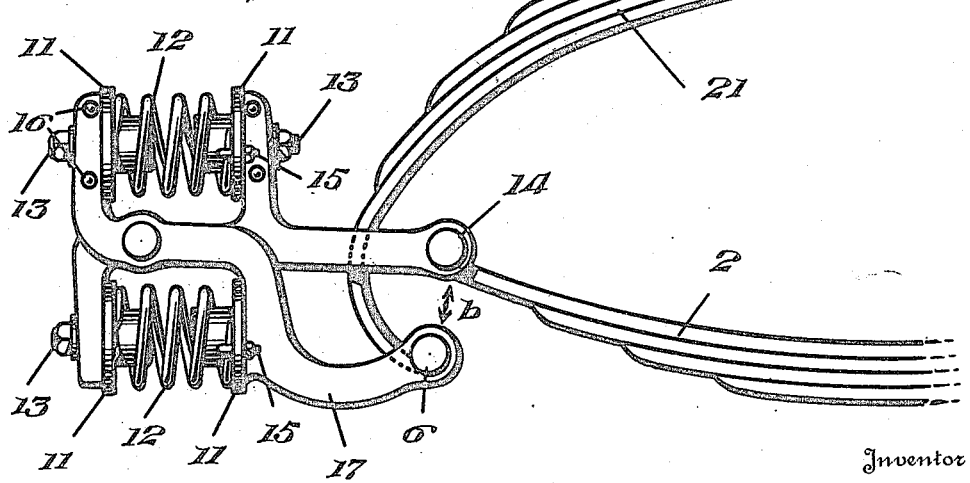

# UNITED STATES PATENT OFFICE.

CHARLES A. WIBERG, OF DULUTH, MINNESOTA.

SHOCK ABSORBER.

1,416,537. Specification of Letters Patent. Patented May 16, 1922.

Application filed November 27, 1920. Serial No. 426,742.

*To all whom it may concern:*

Be it known that I, CHARLES A. WIBERG, a citizen of the United States, residing at Duluth, in the county of St. Louis and State of Minnesota, have invented a new and Improved Shock Absorber, of which the following is a specification.

My present invention has reference to certain improvements in or relating to spring suspension mechanism for motor and other vehicles and is particularly designed for use in connection with large motor cars equipped with side springs and my said invention primarily has for its purpose to provide an improved spring suspension, of the general character referred to, of a relatively economical construction, that can be readily applied to the standard types of motor cars now in use, that will effectively and satisfactorily absorb the vibrations and shocks and make the vehicle run as easily under a minimum or maximum heavy load and, when the said shocks or vibrations are in horizontal or inclined direction.

Another object of my invention is to provide a shock absorber in which the parts are of a simple construction, capable of being easily and compactly arranged by any auto mechanic and for being cooperatively so combined that they will not easily become disarranged under ordinary usage.

With other minor objects in view that will hereinafter appear, my invention comprises, in a shock absorbing or spring suspension means, the peculiar features of construction and novel arrangement of parts, as stated in the following detailed description, specifically set out in the appended claims and illustrated in the accompanying drawings, in which:

Figure 1 is a side elevation of the rear portion of an automobile chassis and spring, with my invention applied.

Figure 2 is a detail plan view, parts being in horizontal section, on the line 2—2 on Figure 1.

Figure 3 is a horizontal section taken through the spring connections, substantially on the line 3—3 on Figure 1.

Figure 4 is an end elvation in the direction of the arrow *x* on Figure 1.

Figure 5 is a detail side elevation of a somewhat modified form of my spring suspension means hereinafter specifically referred to.

Figure 6 is a horizontal section and part plan view thereof on the line 6—6 on Figure 5.

Figure 7 is a side elevation of a further modification of my invention, hereinafter explained.

Referring now more particularly to Figures 1 to 4 of the drawings, which illustrate one arrangement or form of my improved spring suspension or shock absorbing mechanism, 1 designates the rear portion of one of the side or chassis portions of the vehicle frame and 2 a portion of the rear elliptical spring that joins with the rear vehicle axle in the usual way.

My improved shock absorber or spring suspension means is intended as a substitute for the usual link connection that joins the adjacent ends of the parts 1 and 2 and it is in the nature of a substantially A-shaped frame composed of a centrally disposed hanger member 3 that includes an integral pendent arm 4, the purpose of which will presently appear, and a pair of side members 7 that embrace or straddle the hanger member 3, as is clearly shown in Figures 2 and 4.

The inner or upper end of the member 3 is bifurcated and it is hingedly connected with the end of the frame member 1, by a lubricated bolt 6 (see Figure 1) and the outer or lower end of the said member 3 is likewise pivotally joined to the opposite side members 7—7 by a pivot bolt 9 with a grease cup 10, as shown.

The inner ends of the two straddle members 7—7 terminate in upturned apertured heads 70 and the said heads 70 are joined with the inner end of the spring 2 by a pivot bolt 14, as shown.

The outer end of each member 7 terminates in a downwardly bent arm 8 and the said arms 8—8 are bent toward each other and have their lower ends shaped for being held in contact by rivets 16—16 and with an elongated opening 71 between them, the purpose of which will presently appear.

The pendent arm 4 before referred to has a vertical slot 40 that opposes the opposite opening 71 between the arms 8—8 and, in the said opening 71 and slot 40, are held clamp bolts 13—13 which have vertical adjustment in their respective openings in the parts 8—8 and 4.

Each bolt 13 has a head that engages a countersink in their respective oppositely disposed spring seats 11—11 which are adjustably held along the inner face of the members 8—8 and the arm 4.

12 designates a stout coil spring whose opposite ends engage the opposite seats 11—11, each of the said seats having a clamp hook 15 with which the opposite ends of the spring 12 connect, as is clearly shown in Figure 3.

By securing the springs 12 and the spring seats 11—11 between the arm 4 and the opposite members 8—8, as shown and described, the snubber or absorbing spring 12 can be readily moved up or down in accordance with the load it is to carry.

It is understood that the spring 12, when the parts are assembled on the car, will be set to suit the size of the car and will be under a certain compression, through the weight of the load thereon and the said spring functions as a cushioning or snubbing means for absorbing the rebound of the car, when under vibrations or shocks.

In Figures 5 and 6 is shown a somewhat modified arrangement of parts that come within the generic construction of my shock absorbing means.

In the form shown in the said Figures 5 and 6, the parts are shaped and designed for use in connection with an overhung elliptical spring and the hanger member, designated 20, instead of being connected to the chassis member, as in the form of my invention shown in Figures 1 to 4, is pivotally connected at the inner end to the main spring 2 and the straddle members, designated 17—17, connect with the lower end of the elliptical spring 21.

In the form shown in Figures 5 and 6, the connections for the snubber spring 12 are substantially like the spring connection shown in Figures 1 to 4.

In Figure 7 is shown a still further modification of my invention which embodies the same general arrangement shown in Figures 5 and 6, the members 20 and 17 in this latter form being arranged for maintaining two snubber springs 12, one at the top and one at the bottom, as shown, this latter arrangement of my invention being more especially adapted for the heavier cars or for using lighter or more resilient springs than is practical when but one spring is used, as in Figures 1 to 4, thus providing for making the springs of different gage of wire according to the weight of the vehicle body and the probable load strain to which they may be subjected.

The detailed arrangement of the parts shown and described illustrate a practical development of my invention but it is understood that the said details may be varied and still further modified without going beyond my said invention as comes within the scope of the appended claims.

In my construction of shock absorbing means, the members 3 or 20, 7 or 17 in the several arrangements shown, are in the nature of opposing bell crank levers between which the snubber or absorbing springs 12 are so held that they continuously tend to move the two bell crank levers to cause the outer pivoted ends to separate, as indicated by the arrows a, when the parts are made as in Figure 1, and the double arrows b, when the parts are arranged as in Figures 5 and 7.

From the foregoing description taken in connection with the drawings, the complete construction, the manner of its application and the advantages of my invention will be readily apparent to those familiar with the use of motor vehicle accessories of the kind to which my invention relates.

What I claim is:

1. In a spring suspension for vehicles, the combination with opposing shock absorbing members of the vehicle; of a pair of opposing bell crank levers pivotally connected to each other, one of the said levers being pivotally joined at the inner end of one of the shock absorbing members of the vehicle and the other lever pivotally joined at the corresponding end of the other shock absorbing member of the vehicle, the two bell crank levers having oppositely horizontally disposed seats and a horizontally disposed shock absorbing spring sustained at its opposite ends on the aforesaid oppositely disposed seats, the said spring tending to move the opposing levers on their end pivots.

2. A shock absorber comprising two bell crank levers pivoted together between their opposite ends, each lever being adapted for being pivotally connected at their inner ends to opposing shock absorbing members of the vehicle, each of the crank levers including a vertical portion, the two vertical portions opposing one another, a horizontally disposed shock absorbing spring whose opposite ends engage the opposing two portions of the crank levers, the said horizontal spring having vertical adjustment between its end bearings and means for effecting such adjustment.

3. A shock absorber comprising two bell crank levers pivoted together between their opposite ends, each lever being adapted for being pivotally connected at their inner ends to opposing shock absorbing members of the vehicle, each of the crank levers including a vertical portion, the two vertical portions opposing one another, a horizontally disposed shock absorbing spring whose opposite ends engage the opposing vertical portions of the crank levers, the said horizontal spring having vertical adjustment between its end bearings, means for effecting such adjustment, the said means including oppositely disposed spring and receiving seats, an operative connection joining each seat with its respective end bearing of the opposing bell crank levers, each of the said connections including a clamp bolt, each of the said end bearings having a vertical slotway through which their respective clamp bolts pass and in which the said bolts have vertical adjustment.

CHARLES A. WIBERG.